A. HENDRY.
SEWING THREAD AND METHOD OF MAKING THE SAME.
APPLICATION FILED JUNE 29, 1908.
908,771.
Patented Jan. 5, 1909.
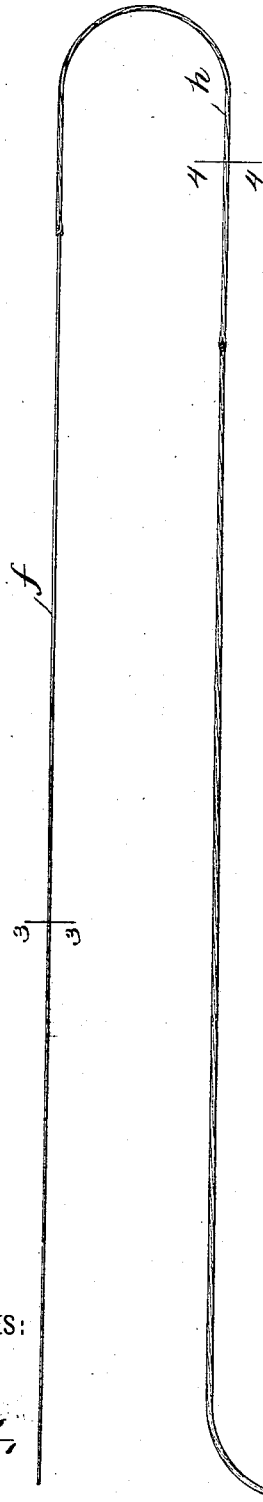
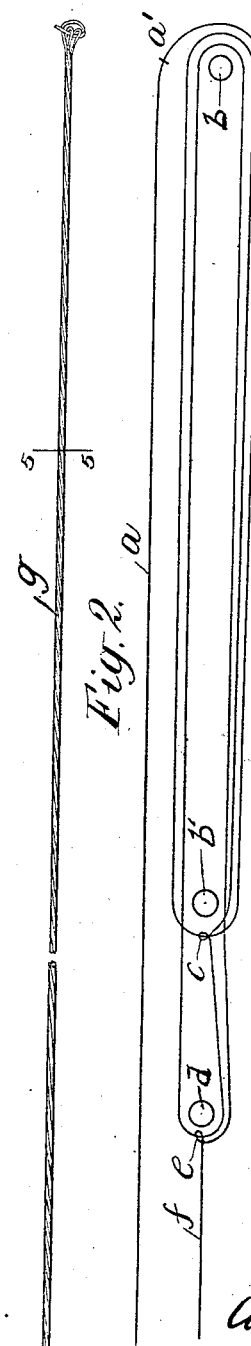
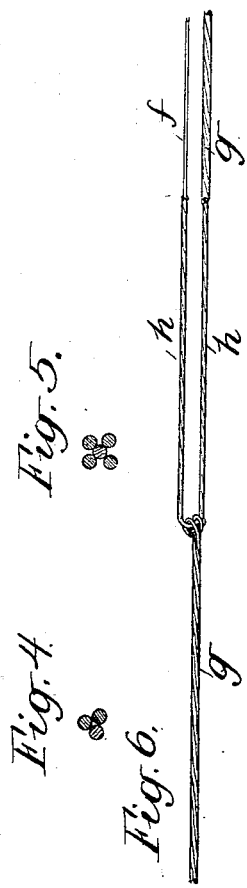
Fig. 1. Fig. 2. Fig. 3. Fig. 4. Fig. 5. Fig. 6.
WITNESSES:
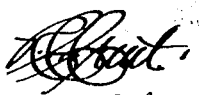
INVENTOR
Alexander Hendry
BY
Pennie & Goldsborough
ATTORNEYS

UNITED STATES PATENT OFFICE.

ALEXANDER HENDRY, OF NEW YORK, N. Y., ASSIGNOR TO LAMINATED BELTING COMPANY, OF NEW YORK, N. Y., A CORPORATION OF NEW YORK.

SEWING-THREAD AND METHOD OF MAKING THE SAME.

No. 908,771.      Specification of Letters Patent.      Patented Jan. 5, 1909.

Application filed June 29, 1908. Serial No. 440,962.

*To all whom it may concern:*

Be it known that I, ALEXANDER HENDRY, a subject of the King of Great Britain, residing in the city of New York, county of New York, and State of New York, have invented certain new and useful Improvements in Sewing-Threads and Methods of Making the Same; and I do hereby declare the following to be a full, clear, and exact description of the invention, such as will enable others skilled in the art to which it appertains to make and use the same.

The invention relates to a sewing-thread which has been primarily intended for sewing together the individual strips going to make up a laminated leather belt, and to a method of making such threads. The threads are adapted for many other uses, and generally where it is desired to employ a strong, heavy thread and where difficulty is experienced in passing the thread through holes or perforations in the material to be sewed.

My improved sewing-thread, which is properly called a section of twine since it is formed from a plurality of strands of thread twisted together, is made up of a main portion of a plurality of strands with which is associated a leader of a single strand, or of a less number of strands than the main portion of the twine-section; and preferably also an intermediate follower portion or portions between the main portion and the leader to follow the leader and thereby introduce the thick twine gradually into the holes.

Referring to the drawings Figure 1 illustrates a completed twine-section or sewing-thread, and Fig. 2 illustrates the twine-section in process of manufacture, Fig. 3 is a cross-section of the leader on the line 3—3 of Fig. 1, Fig. 4 is a cross-section of the follower portion on the line 4—4 of Fig. 1, Fig. 5 is a cross-section of the main portion of the twine on the line 5—5 of Fig. 1, and Fig. 6 illustrates the manner in which two threads, or twine-sections are united in sewing.

The preferred method of making the twine-sections is as follows. I take a single thread $a$ which has preferably first been waxed with "black wax" or the like, and as illustrated in Fig. 2 I form a loop of the thread by passing it around two stationary holders $b$ and $b'$. I then continue the thread to the holder $b'$ again and tie it around the end of the loop as shown at $c$ and then continue it to a second holder $d$ and loop it around that holder and back to the holder $b$, and then continue the thread again to the holder $d$ and tie it around that loop at $e$ and continue it further to form the leader $f$. The loops are then removed from the holder $b$ and the loose end of the thread $a$ tied or twisted about the loops to secure them together and the thread is then fastened by the leader end to a suitable stationary hook or the like and twisted by revolving the loops upon their own axis to twist the thread into a compact twine as shown in Fig. 1. The wax on the thread will have served to stick the different strands of the loops together and the completed twine is preferably rubbed by hand with a cloth or glove or other appropriate device to compact it.

It will be observed that in the particular embodiment shown the completed twine-section is formed from a continuous looped thread, and the main portion $g$ is formed of five strands, the follower portion $h$ of three strands and the leader $f$ of a single strand. It will be understood, however, that the main portion may be made of any number of strands desired and that there may be interposed between the main portion and the leader a series of follower portions of a progressively diminishing number of strands. It will also be understood that instead of forming the entire twine-section of a single thread looped upon itself, it may be formed from different threads tied or twisted or otherwise secured together; though I prefer to use the single thread looped upon itself in the manner indicated.

In my co-pending application Serial No. 440,963 filed of even date herewith I have illustrated a machine which I have designed for manufacturing this sewing-thread or twine-section, but it may, of course, be made in any other appropriate machine or simply by hand without the use of any machine at all.

It will be understood that in use the leader is threaded into the sewing needle which is passed through the holes or perforations of the material to be sewed carrying with it the leader, and that by drawing upon the leader the follower portion or portions may be readily drawn through the holes, and after that the main portion. It is also readily possible to secure a new section of twine to the end of a section which is about used up by passing the leader and follower portion of the used-up twine-section through the end loop of the main portion of the new twine-section and tying it or bending it over those loops as indicated in Fig. 6, and when the new twine-section is then drawn through the material, as for instance the several strands of a belt, the material itself holds the end of the used-up twine-section tightly in the loop of the new twine-section, thereby constituting a practically continuous twine throughout the length of the belt or material sewed.

What I claim is:

1. A sewing-thread or twine-section, comprising a continuous thread looped upon itself to form a main portion of a plurality of strands, the end of the thread extending beyond the main portion to form a leader.

2. A sewing-thread or twine-section comprising a main portion of a plurality of strands, made up of a series of loops in juxtaposition, and a leader of a less number of strands tied through the said loops and extending beyond them.

3. A sewing-thread or twine-section made up of a looped main portion of a plurality of strands, and a leader of a less number of strands tied to the main portion at the loop and extending beyond it.

4. A sewing-thread or twine-section comprising a main portion of a plurality of strands, a follower portion of a less number of strands forming a continuation of the main portion, and a leader of a less number of strands than, and forming a continuation of, the follower portion.

5. A sewing-thread or twine-section comprising a main portion of a plurality of strands, a follower portion of a less number of strands forming a continuation of the main portion, and a leader of a less number of strands than, and forming a continuation of, the follower portion, the separate strands of the thread or twine-section being twisted together.

6. A sewing-thread or twine-section comprising a main portion of a plurality of strands, a follower portion of a less number of strands forming a continuation of the main portion, and a leader of a less number of strands than, and forming a continuation of, the follower portion, the several strands of the thread or twine-section being waxed and twisted.

7. A multiple-strand twine-section made from a continuous thread, comprising a main loop of the thread, a loop of the thread overlying the main loop and extending beyond it to form a follower portion, and a single strand of the thread overlying the main and follower loops and extending beyond them to form a leader.

8. The method of making a sewing-thread or twine-section which consists in forming a loop of thread, overlaying that loop with a second loop extending beyond it to form a follower portion, and overlaying the said two loops with a single strand extending beyond them to form a leader.

9. The method of making a sewing-thread or twine-section which consists in forming a loop of thread, overlaying one side of the loop with the thread and tying the thread through the end of the loop, then continuing the thread to form an extended loop or follower portion, returning it over the other side of the first loop, again overlaying one side of the first loop and of the follower portion with the thread, tying the thread through the end of the extended loop or follower portion, and continuing the thread to form a leader.

10. A sewing-thread or twine-section comprising a main portion of a plurality of loops, and an extended portion of a less number of strands than the main portion, in combination with a second like thread or twine-section, the extended portion of one section passing through the loops of the other section and returning upon itself, to unite the two sections into a continuous sewing-thread.

11. A sewing-thread or twine-section, comprising a main looped portion of a plurality of strands and an extended portion of a less number of strands than the main portion, in combination with a second like thread or twine-section, the extended portion of one section passing through the loop of the other section and returning upon itself, to unite the two sections into a continuous sewing-thread.

In testimony whereof I affix my signature, in presence of two witnesses.

ALEXANDER HENDRY.

Witnesses:
WILLIAM H. DAVIS,
JOHN R. STINE.